United States Patent [19]

Spencer

[11] Patent Number: 5,261,451
[45] Date of Patent: Nov. 16, 1993

[54] PNEUMATIC MULTIPLEXER

[75] Inventor: William R. Spencer, Springdale, Ohio

[73] Assignee: General Electric Company, Cincinnati, Ohio

[21] Appl. No.: 924,433

[22] Filed: Jul. 31, 1992

Related U.S. Application Data

[63] Continuation of Ser. No. 694,580, May 2, 1991, abandoned.

[51] Int. Cl.⁵ .............................................. F16K 37/00
[52] U.S. Cl. .................................... 137/554; 137/551; 137/625.11; 137/625.21
[58] Field of Search ............ 137/625.11, 625.21, 137/625.23, 554, 551

[56] References Cited

U.S. PATENT DOCUMENTS

| | | | |
|---|---|---|---|
| 2,567,428 | 9/1951 | Greeley | 137/625.21 |
| 2,675,830 | 4/1954 | Vuillemin | 137/625.21 |
| 2,878,786 | 3/1959 | Vuillemin | 137/625.23 X |
| 3,246,667 | 4/1966 | Pemberton | 137/312 |
| 3,253,616 | 5/1966 | McCorkle et al. | 137/625.21 |
| 3,689,748 | 9/1972 | Bothne | 235/151.3 |
| 3,696,710 | 10/1972 | Ortelli | 137/625.21 X |
| 4,156,437 | 5/1979 | Chivens et al. | 137/625.41 |
| 4,196,634 | 4/1980 | Heil | 73/756 |
| 4,263,937 | 4/1981 | Rudenko | 137/553 |
| 4,809,748 | 3/1989 | Robins | 137/625.11 |
| 4,830,048 | 5/1989 | Walker | 137/625.21 X |
| 4,913,032 | 4/1990 | Wernberg | 91/361 |
| 4,986,305 | 1/1991 | Richards et al. | 137/625.15 |
| 5,099,867 | 3/1992 | Emery | 137/554 X |

FOREIGN PATENT DOCUMENTS

| | | |
|---|---|---|
| 3234649 | 3/1904 | Fed. Rep. of Germany . |
| 1550291 | 9/1969 | Fed. Rep. of Germany . |

Primary Examiner—John Rivell
Attorney, Agent, or Firm—Bernard E. Shay; Jerome C. Squillaro

[57] ABSTRACT

A pneumatic multiplexer including a stator portion adapted to receive multiple inputs. The stator including a plurality of channels therethrough adapted to channel compressible fluid from the inputs to a stator face. The stator portion including arc grooves therein at each of the stator output holes and pressure relief grooves between the arc grooves.

5 Claims, 2 Drawing Sheets

PNEUMATIC MULTIPLEXER

This application is a continuation of application Ser. No. 07/694,580, filed May 2, 1991, now abandoned.

FIELD OF THE INVENTION

The present invention is directed to an improved pneumatic multiplexer and, more particularly, to a pneumatic multiplexer including arc grooves.

BACKGROUND OF INVENTION

Many pneumatic multiplexers operate in a stepwise rather than continuous manner. Because pneumatic fluids (e.g., air) are compressible, a certain amount of time is required for the pressure at the multiplexer output to stabilize. That is, the pressure at the output does not immediately equal the pressure at the input. The step intervals are designed to be sufficient to enable the output pressure to reach its steady state value.

In pneumatic multiplexers, a rotor may be used to selectively channel fluid from a plurality of inputs to a single output which may be connected to, for example, a pressure transducer. Pneumatic multiplexers may be used to, for example, measure the pressure at a number of pickup points using a single pressure transducer. When used to measure the pressure of a compressible fluid (e.g., air), the pressure of the fluid at the sensor must reach an equilibrium state before the pressure transducer output is valid.

It would be advantageous to drive the multiplexer rotor at a continuous angular velocity rather than stepping the rotor from one input to the next.

SUMMARY OF THE INVENTION

A pneumatic multiplexer including a stator portion adapted to receive multiple inputs. The stator including a plurality of channels therethrough adapted to channel compressible fluid from the inputs to a stator face. The stator portion including arc grooves therein at each of the stator output holes and pressure relief grooves between the arc grooves.

The pneumatic multiplexer further comprising a rotor portion including a channel therethrough, the rotor channel being adapted to channel compressible fluid from the stator face to a single output. The pneumatic multiplexer further comprising a rotor housing fixedly attached to the stator and surrounding the rotor. The rotor housing including a pressure equalization passage connecting the stator face to the reverse face of the rotor. The rotor being held in place by a flexible o-ring seal on its reverse side wherein the o-ring rides on a dynamic seal on the rotor housing.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
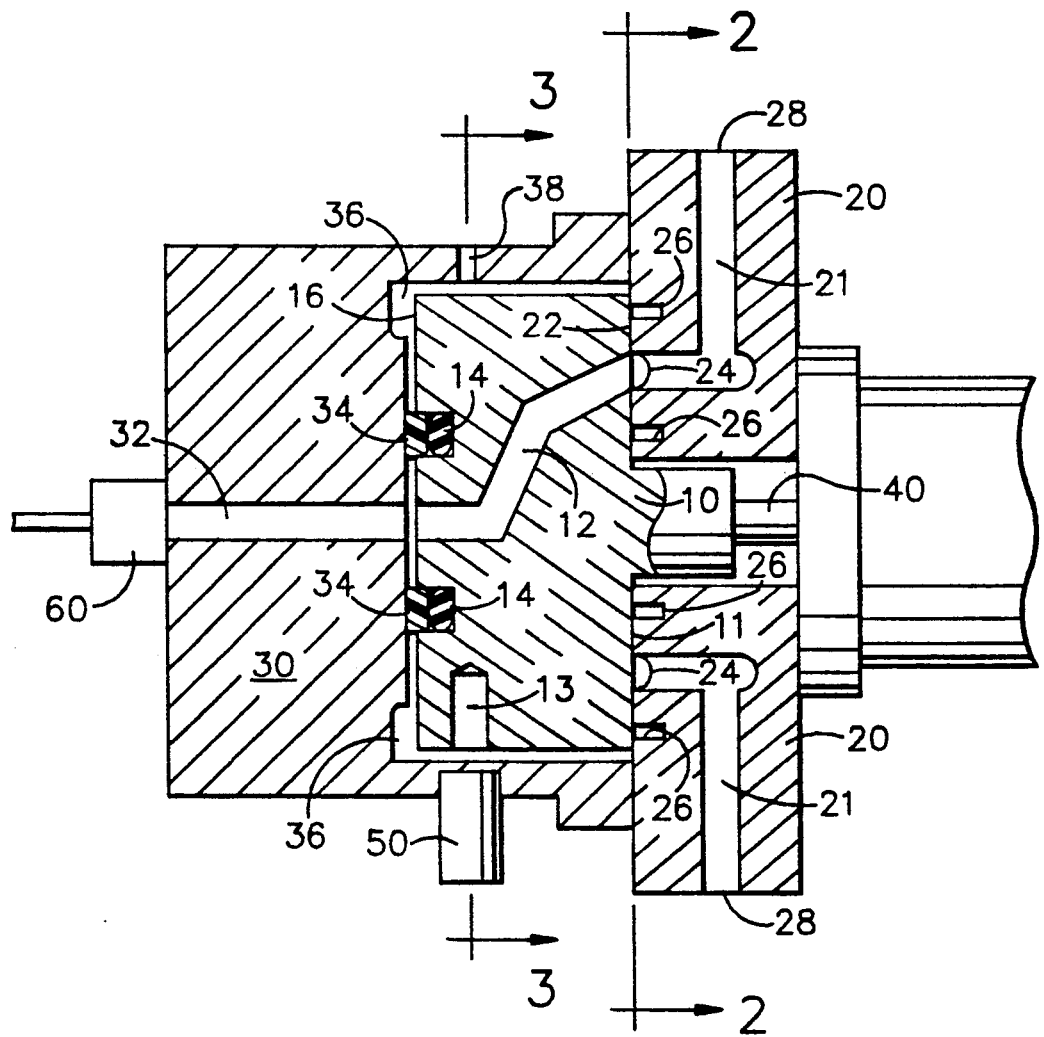
FIG. 1 is a cutaway drawing of a pneumatic multiplexer according to the present invention.

FIG. 1 is a cutaway view of a pneumatic multiplexer comprising a rotor 10, stator 20, and a rotor housing 30. Stator 20 includes stator face 22, arc grooves 24 and relief grooves 26. Stator 20 further includes a plurality of input ports 28 connected to stator face 22 through tubes 21.

Rotor 10 includes channel 12 arranged to sequentially connect the output of tubes 21 in stator housing 20 to a central tube 32 in rotor housing 30. Rotor 10 is rotated with respect to stator 20 by means of an external drive such as driveshaft 40 which may be connected to, for example, a gearhead motor (not shown). Holes 13 are drilled in rotor 10 to provide magnetic anomalies which may be measured by magnetic speed pick-up 50. The rotor 10 is normally manufactured of a ferromagnetic material such as 17-4 PH. Speed pick-up 50 senses holes 13 as rotor 10 rotates and provides timing signals to the logic (not shown which samples the pressure signal at pressure transducer 60.

Rotor 10 further includes o-ring 14 in its reverse face 16. Since rotor 10 is normally manufactured of a ferromagnetic material, an external magnetic speed pick-up detects the position of rotor 10 with respect to rotor housing 30. An O-ring 14 is adapted to ride on a dynamic seal 34 of rotor housing 30. The dynamic seals 34 may be made from, for example, teflon. The compression of o-ring 14 against dynamic seal 34 forces face 11 of rotor 10 against stator face 22 providing a dynamic seal.

The effectiveness of the seal between stator face 22 and rotor face 11 is enhanced by pressure equalization passages 36 in rotor housing 30. When the pressure in the signal ports 28 is sufficient to overcome the compression force of o-ring 14 and force rotor face 11 away from stator face 22, fluid will flow through pressure equalization passage 36 to reverse face 16 of rotor 10. The pressure in passage 36 will sum with the compression force of o-ring 14, forcing rotor face 11 back against stator face 22.

Figure 2:
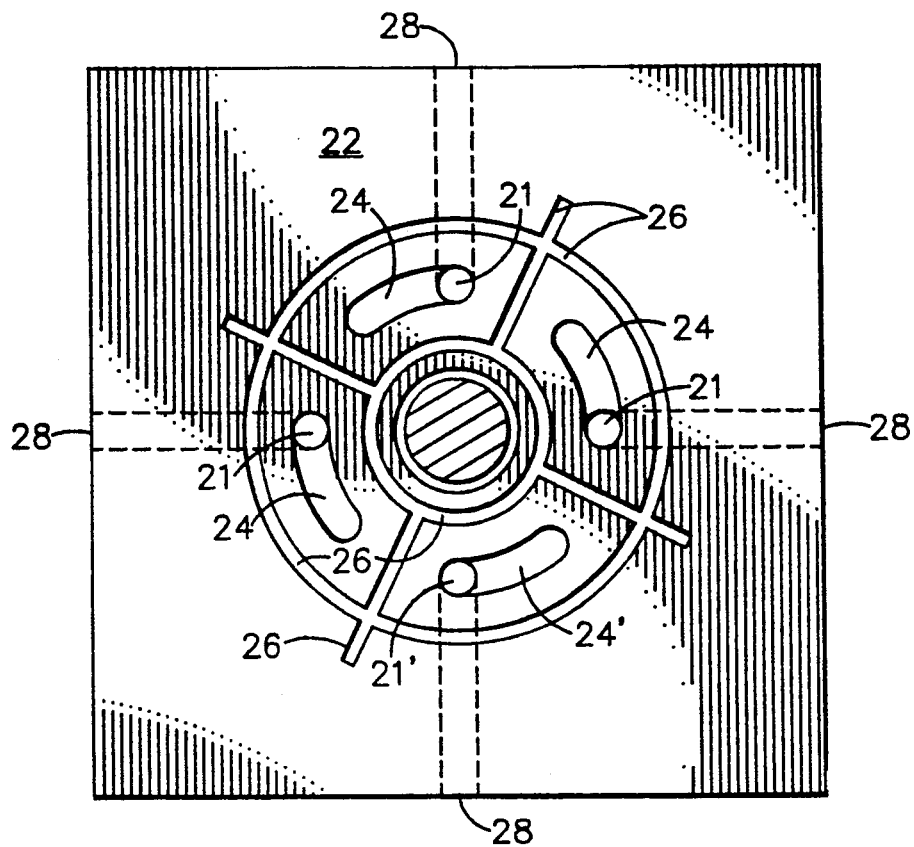
FIG. 2 illustrates a stator face of a pneumatic multiplexer according to the present invention.

In FIG. 2, arc grooves 24 are clearly illustrated. Arc grooves 24 are designed to be at least 4 time constants long (a time constant being defined as $1-1/e$ where $e=2.718282$). As rotor 10 rotates with respect to stator 20, tube 12 will encounter relief groove 26 which vents tube 12, reducing the pressure in tube 12 to the ambient pressure. As rotor 10 rotates farther, it encounters an output of one of tubes 21, for example tube 21' and, as it moves past tube 21', it encounters arc groove 24'. Arc grooves 24 act as an extension of tube 21, maintaining contact between stator tube 21 and rotor tube 12 for a time sufficient to allow the pressure to stabilize in tube 32. It is desirable to allow pressure to stabilize build for at least four (4) time constants. A time constant for a particular compressible fluid may be calculated by dividing the total pressure change by the initial time-rate-of-change of the pressure. It will be apparent that the time-rate-of-change of the pressure is dependent on many variables, including a flow rate of the fluid into the chamber and the volume of the chamber. Therefore, according to one embodiment of the present invention, arc grooves 24 should be long enough to ensure that rotor tube 12 (travelling at a predetermined angular velocity) remains over arc groove 24 for at least four time constants.

In a preferred embodiment of the present invention, the metal-to-metal dynamic seal between rotor face 11 and stator face 22 is provided by the ferromagnetic material of the rotor face and an aluminum hardcoat on the stator face.

An overboard drain 38 from pressure equalization passage 36 allows dust and moisture to be purged from rotor housing 30. In addition, pressure equalization passage 36 is vented by overboard drain 38 to prevent pressure buildup which could drive dirt into the drive shaft area. Overboard drain 38 is small enough to contain pressure surges in passage 36 but large enough to relieve the pressure in passage 36 between pressure surges. The wiping action of rotor 10 helps clear pressure relief grooves 26.

Figure 3:
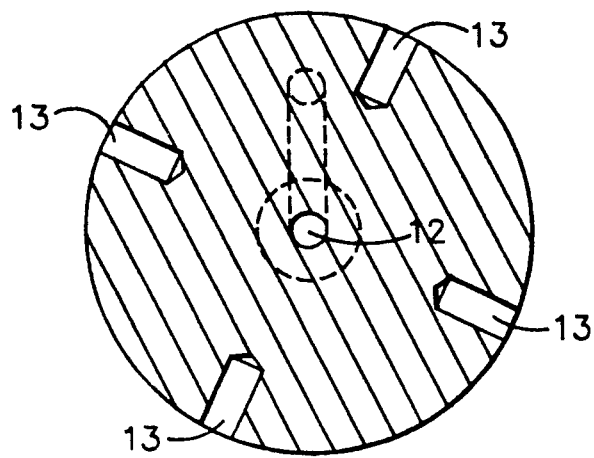
FIG. 3 illustrates a rotor according to the present invention.

FIG. 3 illustrates a cutaway view of rotor 10 according to an embodiment of the present invention. FIG. 3 illustrates radial holes 13. Holes 13 create magnetic anomilies as rotor 10 rotates. The magnetic anomalies are sensed by magnetic speed pickup 50 as holes 13 rotate past. Thus, by properly positioning holes 13, the magnetic speed pickup may indicate to the pressure sensor that the pressure has reached its steady state value (i.e. that the pressure at the sensor has stabilized). It will also be aparent to those of skill in the art that, by using holes 13 which differ in size or depth, the magnetic speed pickup could detect the actual angular position of the rotor. For example, enlarging hole 13' would result in an identifiable change in the output voltage of magnetic speed pickup 50 which could be used to track the position of rotor 10 once each revolution.

While preferred embodiments of the present invention have been shown and described herein, it will be obvious to those skilled in the art that such embodiments are provided by way of example only. Numerous variations, changes and substitutions will now occur to those skilled in the art without departing from the invention. Accordingly, it is intended that the invention be limited only by the spirit and scope of the appended claims.

What I claim is:

1. A pneumatic multiplexer comprising:
    a stator including a stator face and a plurality of input ports;
    a rotor including a first rotor face, a reverse rotor face and a rotor channel extending therebetween;
    a rotor housing fixedly connected to said stator and enclosing said rotor;
    a central tube situated in said rotor housing and being in flow communication with said rotor channel;
    means for driving said rotor at a continuous angular velocity relative to said stator; and
    a plurality of arc grooves in said stator face each being in flow communication with one of said input ports and each sequentially being in flow communication with said rotor channel.

2. A pneumatic multiplexer according to claim 1, further including:
    a relief groove.

3. A pneumatic multiplexer according to claim 2, wherein said rotor includes an o-ring in said reverse face adapted to maintain contact with a dynamic seal on said rotor housing.

4. A pneumatic multiplexer according to claim 3, wherein:
    said rotor housing further includes pressure equalization passages and an overboard drain; and
    means for detecting the angular position of said rotor with respect to said stator.

5. A pneumatic multiplexer according to claim 4, wherein said detecting means comprises: at least one hole drilled in said rotor; and a speed pickup.

* * * * *